United States Patent [19]

Shen

[11] Patent Number: 4,929,432

[45] Date of Patent: May 29, 1990

[54] PROCESS FOR PRODUCING CRYSTALLINE SILICON NITRIDE POWDER

[75] Inventor: Wei-Ming Shen, Strongsville, Ohio

[73] Assignee: Union Carbide Corporation, Danbury, Conn.

[21] Appl. No.: 259,892

[22] Filed: Oct. 19, 1988

[51] Int. Cl.[5] .................... C01B 21/036; C01B 33/06
[52] U.S. Cl. .................................................. 423/344
[58] Field of Search ........................................ 423/344

[56] References Cited

U.S. PATENT DOCUMENTS

| | | | |
|---|---|---|---|
| 3,591,337 | 7/1971 | Lumbey | 23/191 |
| 3,959,446 | 5/1976 | Mazdiyasni et al. | 423/344 |
| 4,122,155 | 10/1978 | Prochazka et al. | 423/344 |
| 4,196,178 | 4/1980 | Iwai et al. | 423/290 |
| 4,416,863 | 11/1983 | Sato et al. | 423/344 |
| 4,590,053 | 5/1986 | Hashimoto et al. | 423/344 |
| 4,594,330 | 6/1986 | Suzuki et al. | 501/92 |

FOREIGN PATENT DOCUMENTS

| | | | |
|---|---|---|---|
| 0023667 | 7/1978 | Japan | 423/345 |
| 0067514 | 5/1980 | Japan | 423/345 |
| 0130807 | 10/1980 | Japan | 423/345 |
| 0088306 | 5/1984 | Japan | 423/345 |
| 1431780 | 4/1976 | United Kingdom . | |

OTHER PUBLICATIONS

Advanced Materials Research Laboratory, Toyo Soda Manufacturing Co., Ltd. Ayase, Kanagawa, Japan, K. Kasal et al. "Synthesis of $Si_3N_4$ Powder by Thermal Decomposition of $Si(NH)_2$ and Sintering Properties", pp. 1278–1288.

Journal of Materials Science 10(1975)–Letters, "Synthesis of the Alpha Form of Silicon Nitride from Silica", pp. 1243–1246.

*Primary Examiner*—John Doll
*Assistant Examiner*—Lori F. Cuomo
*Attorney, Agent, or Firm*—Cornelius F. O'Brien

[57] ABSTRACT

A process for producing crystalline silicon nitride powder by a gas phase reaction of ammonia ($NH_3$) and silane ($SiH_4$) with a molar ratio of 7:1 or above at a temperature of 900° C. or above and the heating the as-reacted amorphous powders at a temperature of 1350° C. to 1800° C. to convert the powders to a highly pure and submicron crystalline silicon nitride powder comprising at least a 90% $\alpha\text{-}Si_3N_4$ phase.

18 Claims, No Drawings

4,929,432

PROCESS FOR PRODUCING CRYSTALLINE SILICON NITRIDE POWDER

FIELD OF THE INVENTION

The invention relates to a process for producing a crystalline silicon nitride powder comprising at least a 90% alpha-$Si_3N_4$ ($\alpha$-$Si_3N_4$) phase.

BACKGROUND OF THE INVENTION

Silicon nitride ceramics have high strength and thermal shock resistance characteristics which make them ideal materials for such applications as ceramic engine parts, cutting tools, bearings, and the like. In order to make reliable and reproducible sintered silicon nitride components, the starting silicon nitride powders should be highly pure. Silicon nitride powders have been prepared using a direct nitridation method in which fine metallic silicon powder is heated at a temperature about 1250° C. in a nitrogen or ammonia atmosphere for a prolonged period. Silicon nitride powder can also be prepared using a carbothermal process in which fine $SiO_2$ powders are reduced with carbon and simultaneously nitrided with nitrogen or ammonia at temperatures higher than 1300° C. In a gas phase synthesis, silicon halides are reacted with ammonia in a tubular reactor at temperatures as high as 1000° C. to produce silicon nitride. Yet another gas phase process involves the thermal decomposition of organosilicon compounds to form amorphous powders. The as-reacted powders are then crystallized by heat treating at temperatures above 1200° C.

In a thermal decomposition of diimide process, silicon halides are reacted with ammonia in a liquid phase at temperatures below 0° C. The precipitates of this process are then converted to $Si_3N_4$ powder by heat treating at temperatures up to 1500° C.

The direct nitridation process not only requires a prolonged heat treatment, but also is difficult to control due to the large amount of energy released (about 5.2 kJ per gram of $Si_3N_4$ formed at 1327° C.) during nitridation. The processing time can be reduced by using Si powders with Fe impurities. However, this practice is not suitable for manufacturing high purity $Si_3N_4$ powders. The carbothermal process requires an excess amount of carbon to facilitate the reduction of $SiO_2$. Any remaining carbon in the product is then removed by oxidative treatments. Thus, $Si_3N_4$ powders produced by the carbothermal process usually contain higher levels of carbon and/or oxygen. The use of reaction promoters, e.g., Mg and Ca compounds, also has negative effects on the purity of $Si_3N_4$ powders.

The gas phase reaction using silicon halides and ammonia as starting materials has two major disadvantages: (i) the process equipment can be plugged up by $NH_4Cl$ deposit, a condensible by-product; and (ii) the presence of residual chloride in the calcined $Si_3N_4$ has unfavorable impacts on powder sinterability. The thermal decomposition of organosilicon compounds produces powders with substantial amounts of carbon, which needs to be eliminated by heat treating in a mild oxidative atmosphere. Thus, this process also suffers from carbon and/or oxygen impurities.

For the thermal decomposition of diimide processes, the formation of $NH_4Cl$ precipitates can plug up the feed and exit pipes in the liquid phase reactor. The diimide precursor also needs to be dechlorinated by heat treating at temperatures up to 800° C. before it can be calcined to produce crystalline $Si_3N_4$ powders. The final $Si_3N_4$ powders still may have up to 100 ppm of chloride.

U.S. Pat. No. 4,122,155 discloses a process for producing crystalline $\alpha$-$Si_3N_4$ powder free of metallic and non-metallic impurities except for oxygen, which consists essentially of reacting a gaseous mixture of silane and anhydrous ammonia at a reaction temperature ranging from about 600° C. to about 1000° C. to produce an amorphous powdery reaction product in an amount of at least 90% of theoretical yield based on silane, said anhydrous ammonia being used in an amount ranging from about 15 times to about 25 times in excess of the stoichiometric amount, calcining said amorphous powdery reaction product at a temperature ranging from about 1400° C. to 1600° C. for a period of time sufficient to convert at least a substantial amount thereof to crystalline $\alpha$-$Si_3N_4$ powder ranging in surface area from about 5 $m^2/g$ to about 15 $m^2/g$, said calcining being carried out in an atmosphere of nitrogen.

It is an object of the present invention to provide an economical process for producing high purity silicon nitride powders.

It is another object of the present invention to provide a process for producing high purity $\alpha$-$Si_3N_4$ powders from the reaction between ammonia and silane in a molar ratio of 7:1 and higher.

It is another object of the present invention to provide a process for producing high purity $\alpha$-$Si_3N_4$ powders that meet the specifications of structural ceramic grade silicon nitride.

The foregoing and additional objects will become fully apparent from the following description.

DISCLOSURE OF THE INVENTION

The invention relates to a process for producing a crystalline silicon nitride powder having at least a 90% $\alpha$-$Si_3N_4$ phase, said process comprising the steps:

(a) preparing a gaseous mixture of ammonia and silane in which the molar ratio of ammonia to silane is from 7:1 to 18:1;

(b) heating the gaseous mixture of step (a) from 900° C. to 1450° C. for a time period sufficient to produce amorphous silicon nitride powders containing up to 10% elemental silicon; and (c) heating the amorphous silicon nitride powders of step (b) in an inert atmosphere at a temperature from about 1350° C. to 1800° C. for a time period sufficient to produce crystalline silicon nitride powders having at least a 90% $\alpha$-$Si_3N_4$ phase.

As used herein, the amorphous silicon nitrate powder produced in step (b) could not only comprise amorphous silicon nitride but could also contain an amount of other reaction products such as silicon.

In step (a) the mixture of ammonia and silane should preferably be prepared at room temperature in a molar ratio of ammonia to silane of 10:1 to 15:1 and most preferably about 10:1. A molar ratio below about 7:1 would generate a powdery product containing too high a concentration of silicon. A molar ratio of 18:1 to 25:1, preferably about 18:1 to 20:1 can be employed if the temperature range in step (b) is increased to 1050° to 1450° C. A molar ratio above 25:1 would not only render the process less economical but also produce amorphous powders with very low levels of silicon; which would require longer heat treatments in step (c). In step (b) the heating should be carried out at 900° C. to 1300°

C. preferably from 1000° C. to 1100° C. At temperatures of 1000° C. and above, powders can be produced that are more stable and will not readily pick up impurities such as $O_2$. Although not wanting to be bound by theory, it is believed that at temperatures of 1000° C. and above, a more complete reaction of the ammonia and silane occurs and therefore the reaction product will not tend to pick-up $O_2$. It is believed that the high temperature properties of sintered silicon nitride components depend on the amount of intergranular glassy phase that contains silicon oxide. If too high an amount of glassy phase were present, then it would restrict the temperature at which the sintered silicon nitride component could be used. Thus it is desirable to limit the oxygen concentration in crystalline silicon nitride powders to less than 2.0% by weight of the powder and preferably to 1.5% by weight of the powder or less. Consequently, the higher reactor temperature in step (b) is an advantage of this invention because it reduces the tendency of the as-reacted amorphous powders to pick up oxygen during storage at room temperature.

Generally, the residence time required for the reaction in step (b) is from about 2 seconds to 1 minute, preferably from about 5 seconds to about 30 seconds. The time period required in step (b) should be sufficient to react ammonia with silane to produce amorphous silicon nitride powders having less than 10% elemental silicon, preferably less than 5% elemental silicon and most preferably less than 2.5% elemental silicon based on the weight of the powders.

In the most preferred process, the as-reacted amorphous powder should have small amounts of elemental silicon between about 0.5 and 2.5 weight percent. This not only requires less excess amounts of ammonia in step (a) but also requires a lower heat treatment temperature in step (c) because the amount of heat generated by the nitridation of residual silicon in step (c) results in the production of heat that can be used in step (c). For example, 1 weight percent of silicon in the as-reacted amorphous powder can contribute 75° C. of heat to the heating step (c) due to the nitridation of the silicon so that the applied heat in step (c) can be reduced by 75° C.

In step (c) the amorphous silicon nitride powders with or without other reaction products are calcined in an inert atmosphere at a temperature of 1350° C. to 1800° C. for a time period sufficient to produce crystalline silicon nitride powders having at least 90% $\alpha$-$Si_3N_4$. Generally the time period for this heat treatment can be from about 10 minutes to 4 hours and preferably from 0.5 hour to 2 hours. It should be understood that the extent of conversion to crystalline silicon nitride will depend largely on the particular calcining temperature and calcining time. For example, to produce crystalline silicon nitride using a calcining temperature of 1400° C. would generally require a calcining time of several hours while using a calcining temperature of 1700° C. would generally require a calcining time of less than 15 minutes. At a temperature below 1350° C., the amorphous powders could not be crystallized with a heat treatment of less than 4 hours. At a temperature above 1800° C., silicon may form which is a decomposition product of $Si_3N_4$ powder. Preferably the calcining temperature should be from about 1350° C. to 1500° C. for from 0.5 hour to 2 hours and most preferably about 1400° C. for 1 hour.

The reaction between $SiH_4$ and $NH_3$ is usually represented by the following equation:

$$3SiH_4 + 4NH_3 \rightarrow Si_3N_4 + 12H_2 \qquad (1)$$

Even though the stoichiometric $NH_3/SiH_4$ ratio is 4:3 as shown in Equation (1), this reaction requires excess $NH_3$. At low $NH_3/SiH_4$ molar ratios, say a ratio of 5:1, relatively large amounts of elemental Si are present in the reaction product. The excessive amount of elemental Si in the as-reacted amorphous powder cannot be completely nitrided within several hours and results in the formation of the less desirable beta-$Si_3N_4$ ($\beta$-$Si_3N_4$). At intermediate $NH_3/SiH_4$ ratios of around 10:1, depending on the reactor temperature and residence time, the amorphous reaction powders have been found to contain 0.0 to 3.3 wt % elemental Si. With the exception of powders with higher Si content, say 3.3%, these amorphous powders can be completely nitrided during the crystallization heat treatment process. The resultant powders will have high $\alpha$-$Si_3N_4$ contents. At high $NH_3/SiH_4$ ratios, e.g., 20, the as-reacted amorphous powders have small amounts of elemental Si. These powders can also be converted to 100% crystalline $Si_3N_4$ powder with high $\alpha$-$Si_3N_4$ contents; however, it generally requires a much longer heat-treatment time. The crystalline silicon nitride powders produced are generally submicron in size and are generally between 0.1 and 0.7 microns. Although not wanting to be bound by theory, it is believed that the size of the powders can be controlled primarily by the calcination temperature and heat treatment time and secondarily by the reaction temperature and residence time. In the present invention it is preferred to use anhydrous ammonia which is substantially free of water vapor. The inert atmosphere can comprise nitrogen and/or ammonia which can further be supplemented with argon and/or helium. Preferably, nitrogen should be used.

In the preferred embodiment of the invention, a reaction chamber should be cleaned by purging or flushing the chamber with an inert gas to remove any gaseous impurities which may be present and then heating the chamber before the silane and ammonia gases are fed in. Provisions shall also be made to introduce an inert gas, such as nitrogen, into the chamber to create a flow of gas that can be used to convey the as-reacted powders to the exit of the chamber where the powders can be collected. Preferably, the chamber is a tubular chamber and the inert gas should be injected tangentially into the tubular chamber to minimize the deposition of as-reacted powders on the inner wall of the chamber. The as-pyrolyzed or as-reacted powders are generally amorphous to x-ray diffraction and generally contain 0 to 10% elemental silicon. These powders are then converted to high purity crystalline $Si_3N_4$ powders with more than 90% $\alpha$-$Si_3N_4$ phase by heat treating at an appropriate temperature in an atmosphere of $N_2$. The required residence time for the crystallization process is a function of calcination temperature. As stated above, it takes less than 15 minutes at about 1700° C., but up to several hours at 1400° C. The BET surface areas of as-reacted amorphous powders range from 11 to 20 $m^2/g$, while the crystallized powders generally range from 5 to 14 $m^2/g$.

EXAMPLE 1

In the first ten samples shown in Table 1, the synthesis reaction was carried out in a quartz reactor, 4.6 cm in diameter and 152 cm long with a 60 cm hot zone, at a $NH_3/SiH_4$ ratio, at a reactor temperature and a residence time as shown in Table 1. The residence time was calculated on the basis of the volumetric flow rates of NH$_3$, SiH$_4$, and N$_2$, the dimension of the reactor hot zone and the reactor temperature. The as-pyrolyzed powders were amorphous to x-ray diffraction and had off-white coloration. To quantitatively determine the amount of elemental Si in the as-pyrolyzed powders, a sample of the as-pyrolyzed amorphous powders were first crystallized by heat treating in an inert atmosphere free of nitrogen at temperatures up to 1400° C. The powder was subsequently subjected to x-ray diffraction and the concentration of elemental Si was quantified on the basis of relative intensities of x-ray diffraction peaks. To prepare crystalline Si$_3$N$_4$ powders, the remaining amorphous powders, in lots of up to 168 grams, were heat treated in a N$_2$ atmosphere at temperatures and time periods shown in Table 1. The powders were placed in crucibles made of quartz, graphite or Si$_3$N$_4$ coated graphite for heat treatment. The heat treatments were carried out in either a resistance heated furnace or an induction furnace. It took one to five hours heat-up time from room temperature to the desired crystallization temperature. The phase composition of the crystallized Si$_3$N$_4$ powders was quantitatively measured from the relative intensities of x-ray diffraction peaks due to $\alpha$-Si$_3$N$_4$, $\beta$-Si$_3$N$_4$, and/or Si phases. As can be seen in Table 1 the amorphous powders of Samples 1 and 2 had only a minute amount of elemental Si and were crystallized to 100% $\alpha$-Si$_3$N$_4$ powders.

In Samples 3–8, the gas phase reaction was carried out at a NH$_3$/SiH$_4$ ratio of 10:1. The reactor temperatures were varied from 900° C. to 1300° C. and the residence time ranged from 3.6 to 6.1 seconds. The amorphous powders had 1.0–3.3% elemental Si. With the exception of Sample No. 3 amorphous powder, which had the highest amount of elemental Si, all the powders were converted to 100% $\alpha$-Si$_3$N$_4$ powders by heat treating at furnace temperatures up to 1400° C. Probably due to a higher temperature resulting from the energy released by the nitridation of 1.0 to 2.0% Si in the amorphous powders, it only took one hour heat treatment at a furnace temperature of 1400° C. to fully crystallize these powders. The calculated adiabatic temperature increases could be 75°–150° C. with 1–2% Si. At the 3.3% Si level, a one hour heat treatment at 1400° C. did not completely nitride the elemental Si, resulting in a crystalline powder with about one-half of the Si remaining in the calcined powder.

In Samples 9–10, the gas phase synthesis was conducted at a low NH$_3$/SiH$_4$ ratio of 5:1. The reactor temperatures were at 1300° C. and 1450° C. respectively. The as-pyrolyzed amorphous powders were brown and had high levels (13–24.5%) of elemental Si. The large amounts of Si could not be completely nitrided with a one hour heat treatment at 1400° C. in a N$_2$ atmosphere. There was also a significant amount of $\beta$-Si$_3$N$_4$ phase in the crystallized powders as a result of much higher sample temperature due to the nitridation of the large amount of silicon.

In Samples 11 and 12, the NH$_3$ and SiH$_4$ reaction was carried out at a reactor temperature of 1000° C. and the NH$_3$/SiH$_4$ ratio of about 10:1. The quartz reactor, 230 cm long and 14 cm in diameter, was heated by an induction furnace with a 152 cm hot zone. A water-cooled injection tube for SiH$_4$/NH$_3$ extended 38 cm into the reactor. These samples had a much lower excess N$_2$ (N$_2$/SiH$_4$=2.5) and a much longer residence time of 22.3 or 24 seconds. Nitrogen was injected from two ports located on the side of the reactor. In Sample 11, the as-pyrolyzed amorphous powder was free of elemental Si and was converted to 100% $\alpha$-Si$_3$N$_4$ by a two hour heat treatment at 1450° C. in a N$_2$ atmosphere. The total recovered powder for Sample 11 was equivalent to a yield of 91.5% based on the total SiH$_4$ usage and about two-thirds of the powder was collected in the vessels downstream from the reactor. The metallic impurities in this crystallized powder of Sample 11 were measured by inductively coupled plasma emission spectroscopy. The only impurity found was 8 ppm B, with other elements below detection limits of 0.8–7.6 ppm. Its oxygen concentration was measured at 0.55%. The powder was essentially free from chloride impurity. The amphorous Sample 12 powder was converted to 92% $\alpha$-Si$_3$N$_4$ and 8% $\beta$-Si$_3$N$_4$ by a heat treatment at 1730° C. for 0.2 hour in a nitrogen atmosphere.

EXAMPLE 2

Sample lots of 1 to 2 grams of amorphous Si$_3$N$_4$ as produced in Sample 1 were calcined at the calcination temperature and calcination time shown in Table II. To minimize the effect of heat-up time, these samples were heat-treated in an induction furnace with generally less than 1 hour heat-up time. As shown in Table II, the crystallization of amorphous Si$_3$N$_4$ powders by heat treating in N$_2$ atmosphere can be achieved at temperatures from 1400° C. to 1700° C. The residence time in the calcination furnace depends on the heat treatment temperature which generally requires four hours at 1400° C., but takes only 15 minutes at 1600°–1700° C. As also shown in Table II, the amount of $\beta$-Si$_3$N$_4$ increases with increasing furnace temperature.

Based on the data shown in Tables I and II, the preferred operation conditions for producing crystalline silicon nitride are as follows:
Reaction: NH$_3$/SiH$_4$=10:1; Temperature=1000°–1100° C.; Residence Time=5–30 seconds.
Crystallization: 1350°–1500° C. for about one to four hours in N$_2$ Although specific embodiments of this invention have been shown and described, it should be understood that various modifications may be made without departing from the spirit of this invention.

TABLE I

| Sample No. | Conditions in the Tubular Reactor | | | | Wt % Elemental Si in Amorphous Powder | Heat Treatment Conditions | | | Phase Composition of Crystallized Si$_3$N$_4$ Powders | | |
|---|---|---|---|---|---|---|---|---|---|---|---|
| | Molar Ratio NH$_3$/SiH$_4$ | Molar Ratio N$_2$/SiH$_4$ | Reactor Temp. (°C.) | Residence Time (sec.) | | Temp. (°C.) | Residence Time (h) | Wt. of Powder (grams) | $\alpha$-Si$_3$N$_4$ (wt %) | $\beta$-Si$_3$N$_4$ (wt %) | Si (wt %) |
| 1 | 20 | 14.2 | 1300 | 3.3 | 0.4 | 1380 | 4 | 50 | 100 | 0.0 | 0.0 |
| 2 | 20 | 14.2 | 1300 | 3.3 | 0.0 | 1380 | 4 | 61 | 100 | 0.0 | 0.0 |
| 3 | 10 | 14.2 | 1300 | 4.6 | 3.3 | 1400 | 1 | 1 | 98.4 | 0.0 | 1.6 |
| 4 | 10 | 14.2 | 1100 | 5.2 | 1.5 | 1400 | 1 | 1 | 100 | 0.0 | 0.0 |
| 5 | 10 | 14.2 | 900 | 6.1 | 1.0 | 1400 | 1 | 1 | 100 | 0.0 | 0.0 |
| 6 | 10 | 7.1 | 1100 | 3.6 | 1.4 | 1400 | 1 | 20 | 100 | 0.0 | 0.0 |
| 7 | 10 | 7.1 | 900 | 4.3 | 2.0 | 1400 | 1 | 8 | 100 | 0.0 | 0.0 |
| 8 | 10 | 7.1 | 900 | 4.3 | 1.2 | 1400 | 1 | 6 | 100 | 0.0 | 0.0 |

TABLE I-continued

| | Conditions in the Tubular Reactor | | | | Wt % Elemental Si in Amorphous Powder | Heat Treatment Conditions | | | Phase Composition of Crystallized Si$_3$N$_4$ Powders | | |
|---|---|---|---|---|---|---|---|---|---|---|---|
| Sample No. | Molar Ratio NH$_3$/SiH$_4$ | Molar Ratio N$_2$/SiH$_4$ | Reactor Temp. (°C.) | Residence Time (sec.) | | Temp. (°C.) | Residence Time (h) | Wt. of Powder (grams) | α-Si$_3$N$_4$ (wt %) | β-Si$_3$N$_4$ (wt %) | Si (wt %) |
| 9 | 5 | 14.2 | 1300 | 5.7 | 24.5 | 1400 | 1 | 1 | 86 | 4.0 | 10 |
| 10 | 5 | 14.2 | 1450 | 5.2 | 13.0 | 1400 | 1 | 25 | 60 | 31 | 9.0 |
| 11 | 10 | 2.5 | 1000 | 24.0 | 0.0 | 1450 | 2 | 6 | 100 | 0 | 0 |
| 12 | 11 | 2.5 | 1000 | 22.3 | 1.0 | 1730 | 0.2 | 168 | 92 | 8 | 0 |

TABLE II

| Heat Treat Temperature (°C.) | Crystallization Kinetics of Amorphous Si$_3$N$_4$ Powder | | | |
|---|---|---|---|---|
| | Residence Time (h) | Amorphous | α-Si$_3$N$_4$ | β-Si$_3$N$_4$ |
| 1300 | 1.0 | 100 | — | — |
| 1400 | 0.5 | >50% | <50% | — |
| 1400 | 1.0 | >50% | <50% | — |
| 1400 | 2.0 | >50% | <50% | — |
| 1400 | 4.0 | <50% | >50% | — |
| 1500 | 1.0 | <20% | >80% | Trace |
| 1600 | 0.25 | — | 95.4 | 4.6 |
| 1600 | 0.50 | — | 95.2 | 4.8 |
| 1600 | 1.0 | — | 95.2 | 4.8 |
| 1700 | 0.25 | — | 94.2 | 5.8 |
| 1700 | 0.50 | — | 91.6 | 8.4 |
| 1700 | 0.50 | — | 95.2 | 4.8 |
| 1700 | 1.0 | — | 95.5 | 4.5 |
| 1700 | 1.0 | — | 90.7 | 9.3 |

What is claimed is:

1. A process for producing crystalline silicon nitride powders having at least a 90% α-Si$_3$N$_4$ phase, said process comprising the steps:
   (a) preparing a gaseous mixture of ammonia and silane in which the molar ratio of ammonia to silane is from 7:1 to 18:1;
   (b) heating the gaseous mixture of step (a) from 900° C. to 1450° C. for a time period sufficient to produce amorphous silicon nitride powders having less than 5% elemental silicon based on the weight of the powders; and
   (c) heating the amorphous silicon nitride powders of step (b) in an inert atmosphere at a temperature from 1350° C. to 1800° C. for a time period sufficient to produce crystalline silicon nitride powders comprising at least a 90% α-Si$_3$N$_4$ phase.

2. The process of claim 1 wherein in step (a) the molar ratio of ammonia to silane is from 10:1 to 15:1.

3. The process of claim 1 wherein in step (b) the time period is from 2 seconds to 1 minute.

4. The process of claim 1 wherein in step (c) the time period is from 15 minutes to 4 hours.

5. The process of claim 1 wherein in step (a) the molar ratio is 10:1 to 15:1; in step (b) the temperature is from 1000° C. to 1100° C. for a time period of 2 seconds to 1 minute; and in step (c) the temperature is from 1350° C. to 1700° C. for a time period of 15 minutes to 4 hours.

6. The process of claim 1 wherein in step (c) the inert atmosphere comprises a gaseous atmosphere containing at least one gas selected from the group consisting of nitrogen and ammonia.

7. The process of claim 6 wherein the gaseous atmosphere contains an additional gas selected from the group consisting of argon and helium.

8. The process of claim 1 wherein in step (b) a reaction chamber is used to heat the gaseous mixture and an inert gas is injected into the chamber to facilitate the collection and removal of the amorphous silicon nitride powders from the reaction chamber.

9. The process of claim 1 wherein in step (a) the molar ratio of ammonia to silane is about 10:1; in step (b) the temperature is from 1000° C. to 1100° C. for a time period of 5 to 30 seconds; and in step (c) the temperature is from 1350° C. to 1500° C. for about one hour in a nitrogen atmosphere.

10. A process for producing crystalline silicon nitride powders having at least a 90% α-Si$_3$N$_4$ phase, said process comprising the steps:
   (a) preparing a gaseous mixture of ammonia and silane in which the molar ratio of ammonia to silane is above 18:1;
   (b) heating the gaseous mixture of step (a) from 1100° C. to 1450° C. for a time period sufficient to produce amorphous silicon nitride powders; and
   (c) heating the amorphous silicon nitride powders of step (b) in an inert atmosphere at a temperature from 1350° C. to 1800° C. for a time period sufficient to produce crystalline silicon nitride powders comprising at least a 90% α-Si$_3$N$_4$ phase.

11. The process of claim 10 wherein in step (a) the molar ratio of ammonia to silane is from above 19:1 to 25:1.

12. The process of claim 10 wherein in step (b) the time period is from 2 seconds to 1 minute.

13. The process of claim 10 wherein in step (c) the time period is from 15 minutes to 4 hours.

14. The process of claim 10 wherein in step (a) the molar ratio is above 18:1 to 20:1, in step (b) the time period is for 2 seconds to 1 minute; and in step (c) the temperature is from 1350° C. to 1700° C. for a time period of 15 minutes to 4 hours.

15. The process of claim 10 wherein in step (c) the inert atmosphere comprises a gaseous atmosphere containing at least one gas selected from the group consisting of nitrogen and ammonia.

16. The process of claim 10 wherein the gaseous atmosphere contains an additional gas selected from the group consisting of argon and helium.

17. The process of claim 10 wherein in step (b) a reaction chamber is used to heat the gaseous mixture and an inert gas is injected into the chamber to facilitate the collection and removal of the amorphous silicon nitride powders from the reaction chamber.

18. The process of claim 10 wherein in step (a) the molar ratio of ammonia to silane is about 20:1; in step (b) the time period is for 5 to 30 seconds; and in step (c) the temperature is from 1350° C. to 1500° C. for about one to four hours in a nitrogen atmosphere.

* * * * *

UNITED STATES PATENT AND TRADEMARK OFFICE
CERTIFICATE OF CORRECTION

PATENT NO. : 4,929,432

DATED : May 29, 1990

INVENTOR(S) : Wei-Ming Shen

It is certified that error appears in the above-identified patent and that said Letters Patent is hereby corrected as shown below:

On the title page:
Abstract, line 4 "the" first occurrence should read ---then---

Column 2, line 52 "nitrate" should read ---nitride---

Signed and Sealed this

Third Day of September, 1991

Attest:

HARRY F. MANBECK, JR.

*Attesting Officer*     Commissioner of Patents and Trademarks